OR 3,834,787

United States Patent
Oshida

[11] 3,834,787
[45] Sept. 10, 1974

[54] METHOD AND APPARATUS FOR MAKING HOLOGRAPHY MEMORY

[75] Inventor: Yoshitada Oshida, Tokyo, Japan

[73] Assignee: Hitachi, Ltd., Tokyo, Japan

[22] Filed: Sept. 18, 1972

[21] Appl. No.: 289,650

[30] Foreign Application Priority Data
Sept. 18, 1971 Japan.............................. 46-72675

[52] U.S. Cl. .............................................. 350/3.5
[51] Int. Cl. ......................................... G02b 27/00
[58] Field of Search . 350/3.5; 340/173 LT, 173 LM

[56] References Cited
UNITED STATES PATENTS
3,559,185  1/1971  Burns................................... 350/3.5
3,684,351  8/1972  Kumada.............................. 350/3.5
3,698,794  10/1972 Alphonse............................ 350/3.5

Primary Examiner—Ronald J. Stern
Attorney, Agent, or Firm—Craig & Antonelli

[57] ABSTRACT

A holography memory, wherein a number of holograms are formed on a predetermined hologram recording medium by the use of reference light beam illuminated at a predetermined angle and an object light beam transmitted through a spatial modulator which causes a phase shift in the transmitted light, and wherein, in order to clearly produce all the reconstructed hologram images at the same position, means to control the quantities of exposure is provided in the optical path of the transmitted light of the spatial modulator, whereby changes in the transmission factor of the spatial modulator which occur when a light beam obliquely incident thereon is transmitted through the spatial modulator, so as to diminish noises generated in the reconstructed hologram images.

18 Claims, 9 Drawing Figures

PATENTED SEP 10 1974 3,834,787

METHOD AND APPARATUS FOR MAKING HOLOGRAPHY MEMORY

BACKGROUND OF THE INVENTION

1. Field of the Invention

The present invention relates to a method and apparatus for making a holography memory. More particularly, it relates to the compensation of noises generated in a spatial modulator which subjects a light beam to phase modulation for recording information.

2. Description of the Prior Art

In order that a number of holograms may be recorded on a predetermined hologram recording medium in the form of a matrix by double exposure means by the use of reference light beam illuminated at a predetermined angle and an object light beam obtained by the transmission of transmitted light through a spatial modulator which imparts a phase shift to the transmitted light beam, and in order that all the reconstructed images of the many recorded holograms may be produced at the same position, it is necessary to use a light beam which is obliquely incident on the spatial modulator. Disadvantageously, however, when light is obliquely incident on the spatial modulator, the transmission factor of light of the spatial modulator varies, and the variations appear as noise in the signals recorded on the hologram recording medium.

More specifically, such a spatial modulator is generally constructed of a crystal of gadolinium molybdate. Electrode plates are provided on both the surfaces of the gadolinium molybdate crystal, so that the state of the crystal can be changed in accordance with the applied voltage. The state of the crystal of gadolinium molybdate is transferred between two states by the applied voltage. Herein, one of the states is called "state A," while the other state is "state B." Preparation of a hologram by the double exposure is conducted as discussed below.

In an optical system employing a half-wave plate, information represented by a "1" is recorded on the hologram recording medium by repeating the exposure of the state A two times or by repeating the exposure of the state B two times. Recording of the information represented by a "0" is carried out by the combination between the first exposure for the state A and the second exposure for the state B, or between the first exposure for the state B and the second exposure for the state A. In an optical system employing a quarter-wave plate, information represented by a "1" is recorded by the combination of the first exposure for the state A and the second exposure for the state B. Recording of information represented by a 0 is conducted by the first exposure for the state B and the second exposure for the state A.

As described above, due to the oblique incidence of light on the spatial modulator, the transmission factors for light through the gadolinium molybdate crystal for the state A and the state B are respectively subject to changes. The disadvantage, therefore, arises that, when the two exposure steps are performed at equal quantities of exposure, the signal 0 for which the reconstructed light signal is to be null is not perfectly extinguished. For this reason, the allowable angle of incidence of the light falling on the spatial modulator should be confined to a small value, and the quantity of information written into the hologram recording medium is limited.

SUMMARY OF THE INVENTION

An object of the present invention is to provide means to reduce noises of reconstructed hologram images which arise on account of variations in the transmission factor of light of a spatial modulator.

Another object of the present invention is to provide a holography memory apparatus of large information quantity, in which the allowable incident angle of light falling on a spatial modulator is made large.

Still another object of the present invention is to provide a holography memory apparatus which is simple in construction and low in cost.

In order to accomplish the above-mentioned objects, according to the present invention, the quantities of the former and latter exposures for the double exposure are appropriately controlled, whereby variations in the light transmissivity of a spatial modulator as are attributable to oblique incidence are compensated so as to diminish the noise in a reconstructed hologram image.

Other objects, features and advantages of the present invention will become apparent by reference to the following description and the accompanying drawings showing the preferred embodiments of the invention.

DESCRIPTION OF THE PREFERRED EMBODIMENTS

Figure 1:
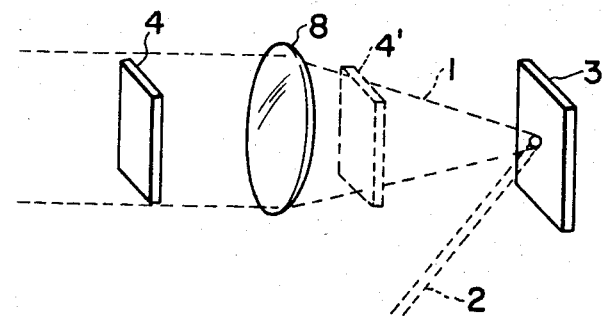
FIGS. 1 and 2 are schematic views each showing the construction of the essential portions of a prior-art holography memory apparatus.
Figure 2:
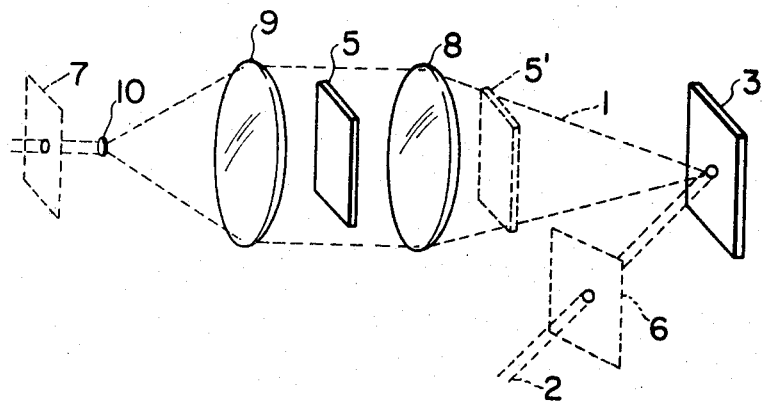
Figure 3:
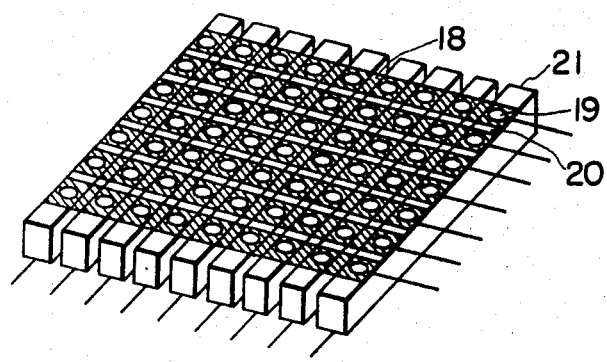
FIG. 3 is a view showing an example of the construction of a spatial modulator.

Prior-art holography memory apparatus each comprising a phase-modulating spatial modulator are shown in FIGS. 1 and 2. The holography memory apparatus in FIG. 1 comprises a spatial modulator 4 employing a half-wave plate, while that in FIG. 2 comprises the spatial modulator 5 employing a quarter-wave plate. In these figures, reference numeral 1 designates a phase-modulated light beam, 2 a reference light beam, 3 a hologram recording medium, 8 to 10 lenses, and 6 and 7 quarter-wave plates. Herein, both the spatial modulators have a structure as shown, by way of example, in FIG. 3. A wave plate 21 is made of a gadolinium molybdate crystal, and is cut in the form of the teeth of a comb. A transparent entire-area electrode is affixed to the rear surface of the wave plate, while bridge-like conductors, shown at 18, are provided on the front surface in a manner to be orthogonal to the comb teeth. At the center of each part at which the crystal and the bridge-like electrode are superposed, there is a round hole 19 through which light passes. At the surface of the part, a transparent electrode is affixed. A member 20, between the respectively adjacent bridges, is an electrical insulation portion. Voltages in the row direction and in the column direction are respectively applied to the bridge-like electrodes on the front surface and to the transparent electrode on the rear surface. Thus, the state of the crystal at each part of the intersection between a row and column is switched to either state A or B, to record information on the hologram recording medium. For the state A, the phase of light is advanced by a half-wavelength (in case of the half-wave plate) or a quarter-wavelength (in case of the quarter-wave plate) over that of the state B. In the apparatus in FIG. 1, the focussed light beam 1, transmitted through the spatial modulator 4 or 4', which is located in front of or behind the lens 8 and which is made of the half-wave plate, and the reference light beam 2 are recorded on the hologram recording medium 3 as an interference fringe. In the apparatus in FIG. 2, the focussed light beam 1 transmitted through the spatial modulator 5 or 5', which is located in front of or behind the lens 8 in the beam expanded by the lenses 10 and 9 and which is made of the quarter-wave plate, and the light beam 2, transmitted through the further quarter-wave plate which is located in the path of the reference light beam and which is a crystal the orientation of which is inverted electrically, are recorded on the hologram recording medium 3 as an interference fringe. As previously discussed, in order that a number of holograms may be arranged on the hologram recording medium 3 and that reconstructed images from such a number of holograms may be obtained at the same position, light which is obliquely incident on the spatial modulator should be used. According to methods for producing holograms using the optical systems as shown in FIGS. 1 and 2, when light is obliquely incident, the light transmission factor of the crystal for the states A and B is subjected to changes. As a result, when the holograms are made by a double exposure process with light beams of equal quantities of exposure, the signal 0, for which the reconstructed light signal is to be extinguished, is not perfectly extinguished and, hence, it appears as noise. For this reason, the allowable incident angle is only about 5°. As previously described, a small allowable incident angle signifies a small quantity of information written in the hologram recording medium. A further holography memory apparatus has been suggested into which a phase modulator is incorporated which compensates for errors in the quantities of the light phase modulation for the states A and B of the crystal for oblique incidence. Even with the prior-art apparatus, noise due to the oblique incidence still exist on account of differences in the transmission factor. The allowable incident angle for this arrangement is approximately 10.5°.

In order to eliminate the disadvantages as mentioned above, the present invention makes the quantities of the former and latter exposures of the double exposure unequal, to thereby decrease the noise. Letting $\phi_{1mn}$ and $\phi_{2mn}$ be the quantities of phase modulation and $a_1$ and $a_2$ be the amplitude transmission factors at the first and second exposures of a phase-modulating element located at an address $(m, n)$ of the spatial modulator in FIG. 3, and letting $E_1$ and $E_2$ be the quantities of exposure at preparation of a hologram, the reconstruction intensity $I_{mn}$ of a reconstructed hologram image at the bit $(m, n)$ is given by the following equation:

$$I_{mn} = C \mid a_1 \sqrt{E_1} \exh [i(\phi_{1mn} - \psi_1)] + a_2 \sqrt{E_2} \exh [i(\phi_{2mn} - \psi_2)] \mid 2/4 \qquad (1)$$

In the above equation, $C$ is a constant, and is a quantity determined by the hologram recording medium, the condition of making the hologram and the intensity of reconstructed light. In the case of the spatial modulator employing the half-wave plate, $\psi_1$ and $\psi_2$ are 0. In the case of the spatial modulator employing a quarter-wave plate, they are the quantities of phase modulation of the phase modulator 6 shown in FIG. 2, and are 0 or $\pi/2$ (in case of the phase modulator 7, 0 or $-\pi/2$). In the case where light is normally incident on the spacial modulator, $\phi_{1mn}$ and $\phi_{2mn}$ become 0 and $\pi$ for the spatial modulator employing the half-wave plate and become $\pi/2$ for the spatial modulator employing the quarter-wave plate, and $a_1$ and $a_2$ are approximately equal. Accordingly, in order to make the signals 0 and 1 for $A_{mn}$, the phase modulation as in Table 1 may be conducted with $E_1$ and $E_2$ equal.

Table 1

Relationship between Quantity of Phase Modulation and Signal at Normal Incidence
(i) Spacial modulator employing half-wave plate.

| Signal | $\psi_1$ | $\phi_{1mn}$ | $\psi_2$ | $\phi_{2mn}$ | $I_{mn}$ |
|---|---|---|---|---|---|
| 0 | 0 | 0 | 0 | $\pi$ | 0 |
| 1 | 0 | 0 | 0 | 0 | $a^2E^2$ |

$a = a_1 = a_2$
$E = E_1 = E_2$ (ii) Spacial modulator employing quarter-wave plate.

| Signal | $\psi_1$ | $\phi_{1mn}$ | $\psi_2$ | $\phi_{2mn}$ | $I_{mn}$ |
|---|---|---|---|---|---|
| 0 | 0 | $\pi/2$ | $\pi/2$ | 0 | 0 |
| 1 | 0 | 0 | $\pi/2$ | $\pi/2$ | $a^2E^2$ |

$a = a_1 = a_2$
$E = E_1 = E_2$

Figure 4:
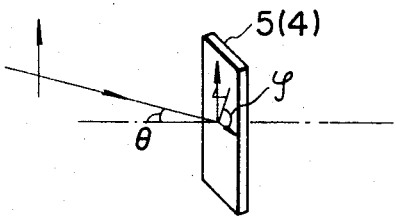
FIG. 4 is a diagram illustrating the polarized direction and the angle of light incident on a spatial modulator.
Figure 5:
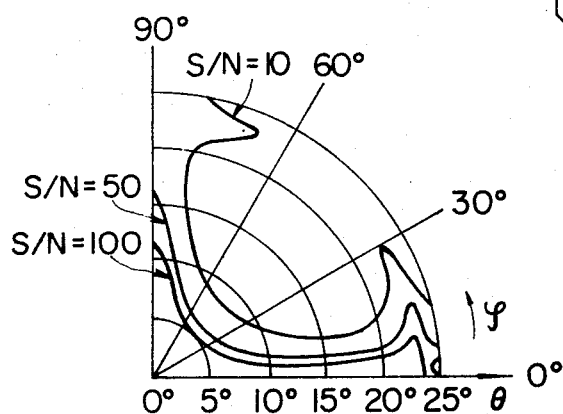
FIG. 5 is a diagram illustrating the signal-to-noise ratio versus the incident angle for phase modulation type holograms employing a prior-art quarter-wave plate.

For light obliquely incident, however, $\phi_{1mn}$ and $\phi_{2mn}$ become 0 and $\pi + \delta_{mn}$ (the spacial modulator employing the half-wave plate), and $a_1$ and $a_2$ become unequal. The recconstructing light intensity ratio between the signal 1 and the signal 0 (the ratio being hereinafter termed the signal-to-noise ratio or simply called S/N), the former becoming a bright image and the latter becoming a dark image in the case of making the hologram at equal quantities of exposure by means of the spatial modulator employing the quarter-wave plate, is shown in FIG. 5 for incident light shown in FIG. 4. The quarter-wave plate of the spatial modulator in this case is made of gadolinium molybdate, and is a Z-cut crystal. Referring to FIG. 5, when S/N is required to be 100 or more, the allowable incident angle is at most 5°. This is attributable to the fact that the above-mentioned $\delta_{mn}$ is not zero, and the fact that $a_1$ and $a_2$ are not equal. According to the present invention, the quantities of exposure $E_1$ and $E_2$ are unequal between the former and latter exposure steps, so that they may satisfy the following relation:

$$a_1 \sqrt{E_1} = a_2 \sqrt{E_2} \qquad (2)$$

Figure 6:
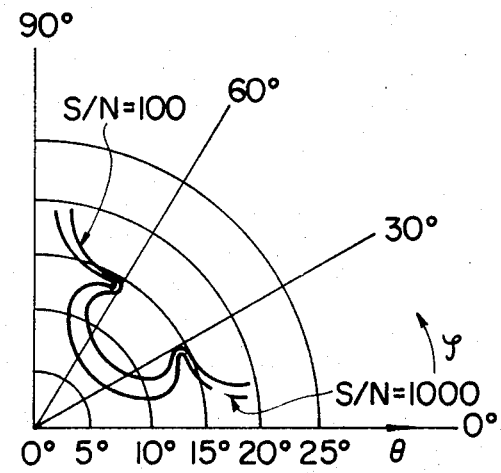
FIG. 6 is a diagram illustrating the signal-to-noise ratio versus the incident angle for holograms obtained by applying the method of the present invention to the phase modulation type holograms employing the quarter-wave plate.

S/N of the reconstructed light signals is thereby made large. With the ratio between the quantities of exposure as given by Equation 2, the allowable angle for a S/N of 100 is expanded to about 8° as illustrated in FIG. 6. In the holography memory of the phase compensation type in which the phase modulator is further inserted so as to compensate for the error $\delta_{mn}$ of the quantity of phase modulation attributable to oblique incidence, the allowable angle can be further expanded by applying the present invention thereto. In the phase compensation type holography memory, the deviations $\delta_{mn}$ of $\phi_{1mn}$ and $\phi_{2mn}$ in Equation 1 from $\pi$ or $\pi/2$ are compensated by the quantity of phase modulation $\delta_c$ of the inserted phase compensator. Thus, the two phase differences of complex numbers in Equation 1 equal $\pi$ for the signal 0.

Figure 7:
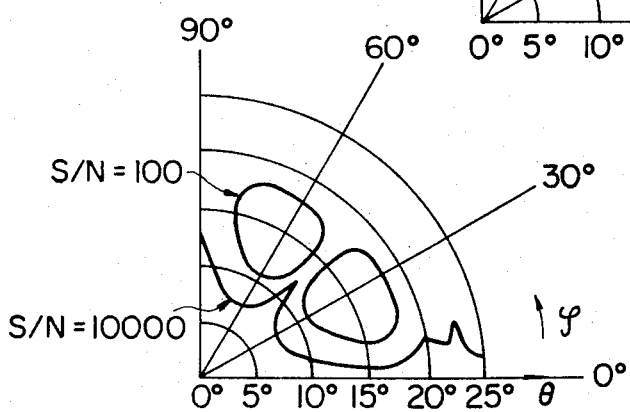
FIG. 7 is a diagram illustrating the signal-to-noise ratio Z of a phase modulation type holography memory with respect to oblique incidence.

The S/N of the reconstructed light signals for oblique incidence in the case where such phase compensating means is provided, is shown in FIG. 7 when the quantities of exposure $E_1$ and $E_2$ are made equal. As is apparent from the figure, the allowable angle for a S/N of 100 is expanded to 10.5° by this means. It is possible to make $I_{mn}$ perfectly equal to zero, make S/N infinity and expand the allowable angle in such a way that the two phase differences of the complex values in Equation 1 are made equal to $\pi$ for the signal 0 by the use of the phase modulating means and the present invention, and the respective absolute values are made equal. Table 2 illustrates the relative intensities between the signal 0 and the signal 1 with regard to the reconstructed light intensity expressed by Equation 1 for the phase modulation type hologram memory adopting the present invention.

Table 2

Relative Intensities of Reconstructed Light Between Signals "0" and "1"

(i) Spatial modulator employing half-wave plate.

| Signal | $\psi_1$ | $\phi_{1mn}$ | $\psi_2$ | $\phi_{2mn}$ | $I_{mn}$ |
|---|---|---|---|---|---|
| 0 | 0 | 0 | $\delta_c$ | $\delta_c$ | 0 |
| 1 | 0 | 0 | $\delta_c$ | 0 | $a^2E^2 \cos^2 \delta_c/2$ |
| | | | | | $aE = a_1E_1 = a_2E_2$ |
| | | | | | $\delta_{mn} = \delta_c$ |

(ii) Spatial modulator employing quarter-wave plate.

| Signal | $\psi_1$ | $\phi_{1mn}$ | $\psi_2$ | $\phi_{2mn}$ | $I_{mn}$ |
|---|---|---|---|---|---|
| 0 | 0 | $\pi/2+\delta_c$ | $\pi/2-\delta_c$ | 0 | 0 |
| 1 | 0 | 0 | $\pi/2-\delta_c$ | $\pi/2+\delta_c$ | $a^2E^2 \cos^2 \delta_c$ |
| | | | | | $aE = a_1E_1 = a_2E_2$ |
| | | | | | $\delta_{mn} = \delta_c$ |

Figure 8:
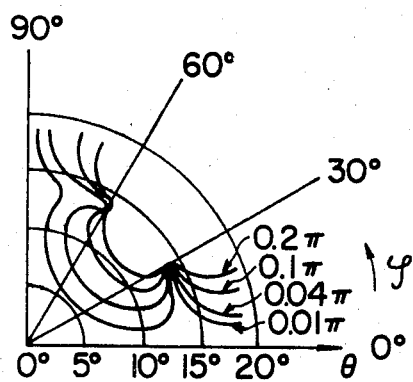
FIG. 8 is a diagram illustrating the error of the quantity of phase modulation of the spatial modulator as is attributable to the oblique incidence.

FIG. 8 is a diagram illustrating the error $\delta_{mn}$ of the phase modulation for oblique incidence on the spatial modulator constructed of a quarter-wave plate. When the value becomes considerably large, the quantity of phase modulation $\delta_c$ for making the signal 0 perfectly equal to zero also becomes large, and the intensity of the signal 1 becomes low. Therefore, it is not the case that the expansion of the allowable angle is unlimited. However, the allowable angle can be expanded to the extent of about 12° to 13° by applying the present invention to the phase compensation type holography memory.

Embodiment I

Figure 9:
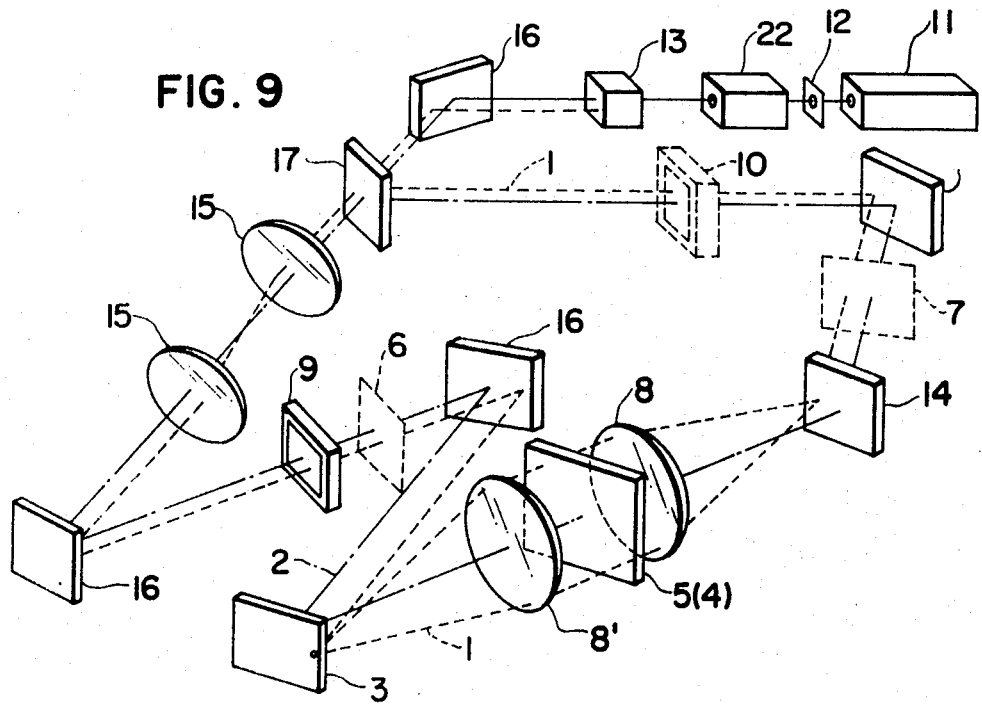
FIG. 9 is a schematic view showing an embodiment of the present invention.

The invention will be described in detail hereunder in conjunction with an embodiment. FIG. 9 shows a laser holography memory apparatus according to the present invention. Reference numeral 11 designates a laser light source, 12 a mechanical shutter, and 22 an electrical shutter employing a quarter-wave plate of gadolinium molybdate. Shown at 13 is a deflector for providing an array of a number of holograms. Numeral 16 indicates a mirror, while numeral 17 represents a beam splitter which serves a split a laser light beam into a reference light beam and an object light beam. The object light beam 1 is illuminated on an illumination hologram 14. The first-order diffracted light passes through a lens 8, and falls on a spatial modulator 5 (or 4). The spatial modulator 5 is composed of a quarter-wave plate (or a half-wave plate) of gadolinium molybdate and has, for example, the structure in FIG. 3. The laser light from the laser light source 11 is linearly polarized in the vertical direction, while the crystal axes of the quarter-wave plate 5 (or 4) are in the vertical and horizontal directions. The phase-modulated beam having been transmitted through the spatial modulator 5 passes through a lens 8', and is illuminated on a hologram recording medium 3.

On the other hand, the reference light beam 2, separated by the beam splitter 17, passes through an optical path-inverting lens system 15, thereby changing its optical path to a position rotated by 180° about the axis (a center line in the figure) of the lens system. Thus, the reference light beam 2 is superimposed on the object light beam 1 on the hologram recording medium 3. The interference fringe of both the light beams is, accordingly, recorded on the hologram recording medium.

In the case of using the spatial modulator made of a quarter-wave plate, a quarter-wave plate of gadolinium molybdate, whose crystal orientation is electrically inverted, is disposed at a position 6 or 7 so that the crystal axes may be vertical and horizontal. In order to obtain the phase compensation type holography memory referred to previously, a phase compensator 9 (or 10) is incorporated into the reference light beam (or the object light beam).

Description will now be made of the method of making holograms by the use of the holography memory apparatus. The position of the beam is selected by means of the optical deflector 13 in conformity with the position of a hologram to be made on the hologram recording medium or an address $(l, k)$ and, simultaneously, the mechanical shutter 12 is opened. Subsequently, the shutter 22, which applies a signal responsive to input information to the spatial modulator and which is electrically driven, is opened, to effect the first exposure. When a predetermined exposure time $t_{1lk}$ elapses, the shutter 22 is closed. Next, the second signal responsive to the input information is applied to the spatial modulator. In the case where the spatial modulator is composed of a quarter-wave plate, the directions of the crystal axes of the quarter-wave plate 6 (or 7) are electrically reversed. The shutter 22 is opened to carry out the second exposure in a predetermined exposure time $t_{2lk}$. Upon completion of the exposure, the shutter 22 is closed, and the mechanical shutter 12 is also closed. Thus, recording of one hologram is finished. Thereafter, further holograms are successively recorded at different positions on the hologram recording medium by the above method. The incident angles of the light beam incident on the spatial modulator 5 or 4 differ in dependence on the recording positions on the hologram recording medium. Therefore, the values of $t_{1lk}$ are previously determined and recorded in conformity with the recording positions, $t_{1lk}$ and $t_{2lk}$ are read out by the driving signals of the deflector as conform to the recording positions of the holograms, and an exposure time-setting terminal of the shutter driving circuit 22 is automatically (or manually) adjusted, whereby the quantities of exposure of the holograms are made different. The quantities of exposure $E_1$ and $E_2$ have proportional relations to $t_{1lk}$ and $t_{2lk}$, respectively.

With the above embodiment, it becomes possible, as previously stated, for the allowable angle of 5° for the oblique incidence in the prior art to be expanded to 8°.

Embodiment 2

There will now be described a method in which the phase compensator 10 or 9 is inserted, to thereby make phase compensation type holograms. In this case, at the second exposure, the quantity of phase compensation of the phase compensator is set at a value as illustrated in FIG. 8 relative to one at the first exposure. The other operations and procedures are the same as in the above.

Although, in the foregoing embodiment, the adjustment of the quantities of exposure is realized by changing the exposure time, the objects of the present invention can also be accomplished in such a way that the exposure periods of time are made equal for both the former and latter exposures, and that an optical attenuator is inserted into the laser beam in order to adjust the quantity of attenuation thereof.

As has been described thus far, according to the present invention, in a system wherein a spatial modulator is composed of a prior-art half-wave plate or quarter-wave plate and wherein recording is conducted by, e.g., double exposure, differences in the transmission factor for oblique incidence of light and dependent on the states of a crystal of the spatial modulator can be compensated by the quantities of exposure, and a holography memory having little noise can be produced. While the spatial modulator in the foregoing embodiment used gadolinium molybdate as its material, the invention is not restricted to the crystal, but any irregular ferroelectric crystal can be employed. For example, KDP, etc., are employable. Table 1 lists the relations between the quantities of phase modulation and the signals at the time when light is normally incident on the spatial modulator. Table 2 lists the signal intensities in the case where the adjustment of the quantities of exposure according to the present invention is applied to the phase compensation holography memory.

While the present invention has been described in detail in the above with reference to its preferred embodiments illustrated by way of example in the accompanying drawings, it is not restricted to the specific embodiments, but various changes and modifications can, of course, be made within a scope not departing from the spirit of the invention.

What I claim is:

1. A method of making a holography memory, comprising the steps of:

forming a first hologram at a predetermined position on a hologram recording medium by a reference light beam illuminated at a predetermined angle and an object light beam imparted with a first phase shift; and forming a second hologram at the same position on said hologram recording medium by subjecting said reference light beam and an object light beam imparted with a second phase shift to a double exposure at quantities of exposure which are respectively different from those of said reference light beam and the first-mentioned object light beam.

2. In a holography apparatus having a coherent light source, a light beam splitter which is arranged in the optical path of the light emitted from said coherent light source, a light beam-expanding system which is arranged in the optical path of one of two light beams split by said beam splitter, a spatial modulator which is arranged in the beam expanded by said light beam-expanding system and which causes a phase shift in the light beam transmitter therethrough, a condensing system which is arranged in either of the path of the expanded beam incident on said spatial modulator and the path of the beam transmitted through said spatial modulator, a hologram recording medium which is arranged behind said spatial modulator and said condensing system, and optical means to direct the other light beam, divided by said light beam splitter, to said hologram recording medium at a predetermined angle, a holography memory apparatus comprising means to change the quantities of double exposure required for formation of holograms, said means being provided in said optical path of said light emitted from said coherent light ssource.

3. A holography memory apparatus according to claim 2, wherein said spatial modulator is composed of a half-wave plate.

4. A holography memory apparatus according to claim 2, wherein said spatial modulator is composed of a quarter-wave plate, and a quarter-wave phase modulator is inserted into either of said reference light beam and said object light beam which are split by said beam splitter.

5. A holography memory apparatus according to claim 3, wherein a phase compensator is inserted into either of said reference light beam and said object light beam which are split by said beam splitter.

6. A holography memory apparatus according to claim 4, wherein a phase compensator is inserted into either of said reference light beam and said object light beam which are split by said beam splitter.

7. A method of making a holography memory, comprising the steps of:

a. providing a first beam of coherent energy;
b. providing a second beam of coherent energy;
c. imparting information of an object for which a hologram is to be made to said first beam to provide a first object beam;
d. imparting a first preselected phase shift to said first object beam to provide a first phase-shifted object beam;
e. combining said second beam of coherent energy and said first phase-shifted object beam on a first portion of a hologram recording medium for a first preselected period exposure;
f. imparting information to said first beam to provide a second object beam and imparting a second preselected phase shift to said second object beam to provide a second phase-shifted object beam; and g. combining said second beam of coherent energy and said second phase-shifted object beam on said first portion of said hologram recording medium for a second preselected period of exposure;

whereby a double exposure hologram having an increased signal-to-noise ratio is produced.

8. A method according to claim 7, further including the steps of shifting the positions of said first and second coherent energy beams and repeating steps (a) – (g) for said shifted positions to provide a second double exposure hologram, the first and second preselected periods of exposure of which are determined in accordance with the shifted position upon said hologram recording medium upon which said second hologram is formed.

9. A method according to claim 7, further including the step of imparting a prescribed amount of phase compensation to one of said first and second beams of coherent energy prior to its impingement on said hologram recording medium during one of said first and second period of exposure.

10. An apparatus for forming at least one hologram comprising:

first means for providing a first beam of coherent energy;

second means for providing a second beam of coherent energy;

third means, disposed in the path of said first beam for imparting in formation, of an object for which a hologram is to be formed, to said first beam to provide an object beam;

fourth means, disposed in the path of said object beam, for imparting a controlled phase shift to said object beam for a controlled period of time to provide a phase-shifted object beam;

fifth means, disposed in the path of said second beam and said phase-shifted object beam, for recording the interference pattern of the beams impinging thereon, at a prescribed location thereof, to thereby effect the recordation of a hologram; and sixth means, disposed in the path of said energy beams and coupled to said third and fourth means, for controlling the phase-shift and period of exposure of the beams impinging on said fifth means, to thereby effectively equalize the quantities of exposure of the beams incident on said fifth means, for recording double exposure holograms with substantially reduced noise.

11. An apparatus according to claim 10, wherein said sixth means comprises means for controlling the period of exposure of said beams in dependence on the angle incidence thereof on said fifth means.

12. An apparatus according to claim 10, wherein said fourth means comprises a spatial modulator, responsive to an input signal applied thereto, for shifting the phase of the beam passing therethrough by a controlled amount.

13. An apparatus according to claim 12, wherein said spatial modulator comprises a half-wave plate spatial modulator.

14. An apparatus according to claim 12, wherein said spatial modulator comprises a quarter-wave plate spatial modulator and wherein said apparatus further includes a quarter-wave plate phase modulator disposed in the path of one of said first and second energy beams.

15. An apparatus according to claim 10, further including a phase compensation element disposed in the path of one of said first and second energy beams.

16. An apparatus according to claim 12, further including a phase compensation element disposed in the path of one of said first and second energy beams.

17. An apparatus according to claim 10, wherein said third means includes an illumination hologram disposed in the path of said first beam and a controlled shutter means for directing said first beam thereon.

18. An apparatus according to claim 16, wherein said third means includes an illumination hologram disposed in the path of said first beam and a controlled shutter means for directing said first beam thereon.

* * * * *